(12) United States Patent
Yun et al.

(10) Patent No.: US 11,158,863 B2
(45) Date of Patent: Oct. 26, 2021

(54) CATALYST COMPOSITE FOR FUEL CELL AND METHOD OF MANUFACTURING THE SAME

(71) Applicants: Hyundai Motor Company, Seoul (KR); KIA Motors Corporation, Seoul (KR)

(72) Inventors: Sukhwan Yun, Gyeonggi-do (KR); Bo Ki Hong, Seoul (KR); Jong Kil Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 16/272,656

(22) Filed: Feb. 11, 2019

(65) Prior Publication Data

US 2020/0127296 A1    Apr. 23, 2020

(30) Foreign Application Priority Data

Oct. 17, 2018 (KR) .......................... 10-2018-0123827

(51) Int. Cl.
| | |
|---|---|
| *H01M 4/86* | (2006.01) |
| *H01M 4/92* | (2006.01) |
| *H01M 4/88* | (2006.01) |
| *H01M 8/1018* | (2016.01) |

(52) U.S. Cl.
CPC ........... *H01M 4/8668* (2013.01); *H01M 4/88* (2013.01); *H01M 4/921* (2013.01); *H01M 4/926* (2013.01); *H01M 2008/1095* (2013.01)

(58) Field of Classification Search
CPC .......................... H01M 4/8668; H01M 4/926
See application file for complete search history.

(56) References Cited

U.S. PATENT DOCUMENTS

| | | | | |
|---|---|---|---|---|
| 2015/0295250 | A1* | 10/2015 | Nagami | H01M 4/926 |
| | | | | 429/524 |
| 2015/0364769 | A1* | 12/2015 | Cerri | B29C 66/73141 |
| | | | | 429/528 |
| 2019/0103613 | A1* | 4/2019 | Tsuchida | H01M 4/8892 |

FOREIGN PATENT DOCUMENTS

| | | |
|---|---|---|
| JP | 5686988 B2 | 3/2015 |
| KR | 100647296 B1 | 11/2006 |
| KR | 101503941 B1 | 3/2015 |
| KR | 101849818 B1 | 4/2018 |

(Continued)

OTHER PUBLICATIONS

Kreuer, K.D., "On the development of proton conducting polymer membranes for hydrogen and methanol fuel cells," Journal of Membrane Science, 185 (2001) 29-39.

(Continued)

*Primary Examiner* — Jonathan Crepeau (74) *Attorney, Agent, or Firm* — Morgan, Lewis & Bockius LLP (57) ABSTRACT

Disclosed are a catalyst composite for a fuel cell and a method of manufacturing the same. The catalyst composite includes a support containing carbon (C), a metal catalyst supported on the support, and an ionomer binder coated on the surface of the support and on the surface of the metal catalyst. The ionomer binder coated on the surface of the metal catalyst is formed so as to be thinner than the ionomer binder coated on the surface of the support.

6 Claims, 3 Drawing Sheets

(56) References Cited

FOREIGN PATENT DOCUMENTS

KR    1020200129795    * 11/2020

OTHER PUBLICATIONS

Inaba, Minoru, "Gas crossover and membrane degradation in polymer electrolyte fuel cells," ScienceDirect, Electrochimica Acta 51 (2006) 5746-5753.

* cited by examiner

CATALYST COMPOSITE FOR FUEL CELL AND METHOD OF MANUFACTURING THE SAME

CROSS-REFERENCE TO RELATED APPLICATION

This application claims priority to and the benefit of Korean Patent Application No. 10-2018-0123827, filed on Oct. 17, 2018, the entire contents of which are incorporated herein by reference.

FIELD

The present disclosure relates to a catalyst composite for a fuel cell and a method of manufacturing the same.

BACKGROUND

The statements in this section merely provide background information related to the present disclosure and may not constitute prior art.

A polymer electrolyte membrane fuel cell (PEMFC) is a high-power fuel cell having a large current density. In order to be applied to vehicles, the PEMFC may exhibit high-power performance of at least several tens of kW under various operational conditions of the vehicles. For example, the PEMFC should be able to stably operate, overcome a water leakage problem and have a high driving speed over a wide current density range.

The reaction for electricity production by a fuel cell can occur in a membrane-electrode assembly (MEA), which includes an ionomer-based electrolyte membrane and electrodes including an anode and a cathode. In order to increase the performance of the electrode for a PEMFC, we have discovered that it is desirable that proton conductivity and the hydrophilicity of the electrode and the catalyst included in the electrode be improved.

For example, we have discovered that a proton-conductivity enhancer may be provided on or near the surface of the electrode to increase the performance of a unit cell of the fuel cell. Hydrogen peroxide or inorganic acid, which is a precursor of a proton-conductivity enhancer, may be decomposed on or near the surface of the catalyst layer through plasma treatment, and at least one proton-conductivity enhancer selected from the group consisting of —OH, —OSO$_3$H, —COOH, —SO$_3$H and —PO(OH)$_3$ may be provided on the surface of the electrode.

Ionomers for use in fuel cells, including electrolyte membranes, may have hydrogen ion or proton exchange properties and well-balanced thermal, mechanical and chemical properties. In the case of a perfluorosulfonic acid (PFSA) ionomer-based electrolyte membrane, phase separation between a hydrophobic fluorocarbon-based main chain region and a hydrophilic ion cluster region is realized, and wide and long hydrogen ion or proton-conducting channels are formed. On the other hand, a hydrocarbon ionomer-based electrolyte membrane has short and narrow proton-conducting channels (K. D. Kreuer, Journal of Membrane Science, 185 (2001) 29-39).

The above information disclosed in this Background section is only for enhancement of understanding of the background of the disclosure and therefore it may contain information that does not form the prior art that is already known to a person of ordinary skill in the art.

SUMMARY

The present disclosure provides a catalyst composite for a fuel cell, in which an ionomer binder coated on the surface of a metal catalyst is formed so as to be thinner than an ionomer binder coated on the surface of a carbon-containing support, and a method of manufacturing the same.

The present disclosure also provides a catalyst composite for a fuel cell, in which the oxygen mass transport resistance of an ionomer binder coated on the surface thereof is reduced, and a method of manufacturing the same.

In one aspect, the present disclosure provides a catalyst composite for a fuel cell including a support including carbon (C), a metal catalyst supported on the support, and an ionomer binder coated on a surface of the support and on a surface of the metal catalyst, wherein the ionomer binder coated on the surface of the metal catalyst is formed so as to be thinner than the ionomer binder coated on the surface of the support.

In one aspect, the ionomer binder coated on the surface of the metal catalyst may be formed so as to be thinner than the ionomer binder coated on the surface of the support through the use of an oxygen-containing intermediate radical.

In one aspect, the ionomer binder coated on the surface of the metal catalyst may be formed so as to be thinner than the ionomer binder coated on the surface of the support through the use of a solution including hydrogen peroxide ($H_2O_2$).

In one aspect, the metal catalyst may include platinum (Pt).

In one aspect, the metal catalyst may include a platinum-transition metal alloy, and the transition metal may include at least one selected from the group consisting of scandium (Sc), titanium (Ti), vanadium (V), chromium (Cr), manganese (Mn), iron (Fe), cobalt (Co), nickel (Ni), copper (Cu), zirconium (Zr), yttrium (Y), niobium (Nb), molybdenum (Mo), ruthenium (Ru), rhodium (Rh), palladium (Pd), cadmium (Cd), iridium (Ir) and silver (Ag).

In one aspect, the metal catalyst may include a platinum-rare earth metal alloy, and the rare earth metal may include at least one selected from the group consisting of lanthanum (La), cerium (Ce), samarium (Sm), gadolinium (Gd), terbium (Tb), dysprosium (Dy) and thulium (Tm).

In one aspect, the ionomer binder may include a perfluorosulfonic acid ionomer.

In another aspect, the present disclosure provides a method of manufacturing a catalyst composite for a fuel cell, the method including preparing a carbon-containing support on which a metal catalyst is supported, coating an ionomer binder on a surface of the metal catalyst and on a surface of the support, and performing selective thin filming of the ionomer binder such that the ionomer binder coated on the surface of the metal catalyst is formed so as to be thinner than the ionomer binder coated on the surface of the support.

In one aspect, the performing selective thin filming of the ionomer binder may include deteriorating the ionomer binder using an oxygen-containing intermediate radical.

In one aspect, the oxygen-containing intermediate radical may be derived from a solution including hydrogen peroxide.

In one aspect, the performing selective thin filming of the ionomer binder may include contacting the ionomer binder with Fenton's reagent, and protonating ferrous cations ($Fe^{2+}$), derived from the Fenton's reagent, with protons ($H^+$).

In one aspect, the Fenton's reagent may include hydrogen peroxide in a concentration of 5% by weight to 30% by weight.

In one aspect, the Fenton's reagent may include ferrous cations ($Fe^{2+}$) in a concentration of 3 ppm to 50 ppm.

In one aspect, the Fenton's reagent may further include at least one selected from the group consisting of magnesium ions ($Mg^{2+}$), calcium ions ($Ca^{2+}$), nickel ions ($Ni^{2+}$), copper ions ($Cu^{2+}$) and zinc ions ($Zn^{2+}$).

In another aspect, the contacting the ionomer binder with the Fenton's reagent may be performed at an ambient temperature of 10° C. to 95° C.

In one aspect, the contacting the ionomer binder with the Fenton's reagent may be performed for 20 seconds to 600 seconds.

In one aspect, the protonating ferrous cations ($Fe^{2+}$) with protons may include contacting a solution including sulfuric acid ($H_2SO_4$) with the ionomer binder.

In one aspect, the sulfuric acid may be present in a concentration of 0.1 mol/L to 3 mol/L.

In one aspect, the method may further include, after the performing selective thin filming of the ionomer binder, preparing an electrode including a catalyst composite. The protonating ferrous cations ($Fe^{2+}$) with protons may be performed by supplying hydrogen or oxygen to the electrode to activate the electrode.

In one aspect, the protonating ferrous cations ($Fe^{2+}$) with protons may be performed by operating a fuel cell, including the electrode, at a relative humidity (RH) of 10% to 100%.

Other aspects of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

It should be understood that the appended drawings are not necessarily to scale, presenting a somewhat simplified representation of various features illustrative of the basic principles of the disclosure. The specific design features, including, for example, specific dimensions, orientations, locations, and shapes, will be determined in part by the particular intended application and use environment.

In the figures, reference numbers refer to the same or equivalent parts throughout the several figures of the drawing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "includes," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element such as a layer, film, region, or plate is referred to as being "on" another element, it can be directly on the other element or intervening elements may also be present. It will be understood that when an element such as a layer, film, region, or plate is referred to as "under" another element, it can be directly under the other element or intervening elements may also be present.

Unless otherwise indicated, all numbers, values and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

In the context of this specification, where a range is stated for a parameter, it will be understood that the parameter includes all values within the stated range, inclusive of the stated endpoints of the range. For example, a range of "5 to 10" will be understood to include the values 5, 6, 7, 8, 9, and 10 as well as any sub-range within the stated range, such as to include the sub-range of 6 to 10, 7 to 10, 6 to 9, 7 to 9, etc., and inclusive of any value and range between the integers which is reasonable in the context of the range stated, such as 5.5, 6.5, 7.5, 5.5 to 8.5 and 6.5 to 9, etc. For example, a range of "10% to 30%" will be understood to include the values 10%, 11%, 12%, 13%, and all integers up to and including 30%, as well as any sub-range within the stated range, such as to include the sub-range of 10% to 15%, 12% to 18%, 20% to 30%, etc., and inclusive of any value and range between the integers which is reasonable in the context of the range stated, such as 10.5%, 15.5%, 25.5%, etc.

Hereinafter, aspects of the present disclosure will be described in detail with reference to the accompanying drawings.

Figure 1:
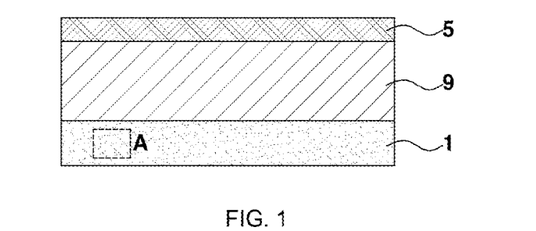
FIG. 1 is a view schematically showing an electrode in which a catalyst composite for a fuel cell according to aspects of the present disclosure is included.
Figure 2:
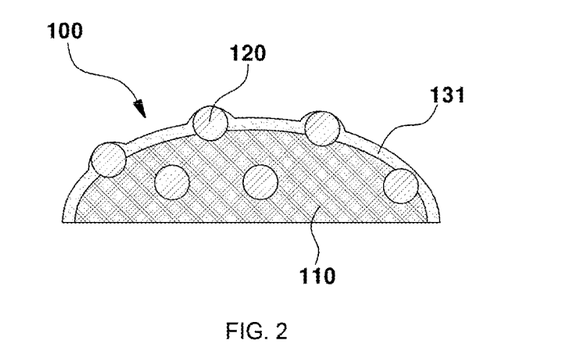
FIG. 2 is an enlarged diagram of portion A in FIG. 1, which shows the internal microstructure of the electrode.

FIG. 1 is a view schematically showing an electrode in which a catalyst composite for a fuel cell according to aspects of the present disclosure is included. FIG. 2 is an enlarged diagram of portion A in FIG. 1, which shows the internal microstructure of the electrode.

Referring to FIG. 1, the electrode for a fuel cell may include a cathode 1 and an anode 5. A membrane-electrode assembly (MEA) may be constituted by forming an electrolyte membrane 9 between the cathode 1 and the anode 5.

Particularly, by applying the catalyst composite for a fuel cell according to the present disclosure to the cathode 1, it may be possible to increase the rate of the oxygen reduction reaction (ORR) of the cathode 1, in which the reaction rate or kinetics of the catalyst is particularly low, or to reduce the oxygen mass transport resistance of the ionomer binder coated on the catalyst so that oxygen can easily pass therethrough, thereby improving the efficiency of use of the electrode. However, the present disclosure is not limited thereto. For example, the catalyst composite according to the present disclosure may be applied to the anode 5 to reduce the hydrogen mass transport resistance, thereby facilitating the hydrogen oxidation reaction (HOR).

The structure of the catalyst composite for a fuel cell according to aspects of the present disclosure is schematically shown in FIG. 2.

The catalyst composite 100 according to the present disclosure may include a support 110 containing carbon (C), a metal catalyst 120 supported on the support 110, and an ionomer binder 131 coated on the surfaces of the support 110 and the metal catalyst 120.

In order to drive the polymer electrolyte membrane fuel cell, the metal catalyst 120 included in the catalyst composite 100 may facilitate the electrochemical reaction (e.g. HOR or ORR) of reactive gas (e.g. hydrogen) of the anode 5, which is an oxidation electrode, and reactive gas (e.g. oxygen) of the cathode 1, which is a reduction electrode.

In the catalyst composite 100, the support 110 (e.g. a carbon-containing support) serves as an electrical conductor for transferring electrons.

In the catalyst composite 100, the ionomer binders 130 and 131 may bind the metal catalyst 120 and the support 110. That is, the ionomer binder may three-dimensionally interconnect the support 110 and the metal catalyst 120 to increase the physical robustness of the catalyst composite and the electrode including the same.

The catalyst composite 100 according to the present disclosure is distinguished from the related art in that the ionomer binder 131 coated on the surface of the metal catalyst 120 is formed so as to be thinner than the ionomer binder 131 coated on the surface of the support 110. Accordingly, when the catalyst composite 100 is applied to the cathode 1 having a low catalytic reaction rate, oxygen, which is a reactant of the oxygen reduction reaction, may easily penetrate the ionomer binder 131 coated on the metal catalyst 120 and the support 110, and the oxygen mass transport resistance may thus be reduced. That is, due to the formation of the ionomer binder 131 having a selective thickness, the oxygen mass transport resistance may be reduced, and accordingly the performance of the electrode may be enhanced.

In the case in which both the thickness of the ionomer binder 130 coated on the metal catalyst 120 and the thickness of the ionomer binder 130 coated on the support 110 are uniformly reduced, the physical robustness and proton conductivity of the catalyst composite 100 may be reduced, resulting in deterioration of durability and performance. Therefore, due to the formation of the ionomer binder 131 having a selective thickness according to the present disclosure, it is possible to secure high proton conductivity without reducing the physical robustness of the catalyst composite 100 and the electrode including the same.

In addition, due to the oxygen mass transport resistance of the ionomer binder 131, it is possible to maintain the performance of the electrode at an equivalent or higher level while reducing the use of an expensive metal catalyst (e.g. platinum (Pt)). The ionomer binder 131 may be formed so as to expose a portion of the surface of the metal catalyst 120, without being limited thereto.

According to the present disclosure, the ionomer binder 131 coated on the surface of the metal catalyst 120 may be formed so as to be thinner than the ionomer binder 131 coated on the surface of the support 110 through the use of an oxygen-containing intermediate radical. The oxygen-containing intermediate radical may include at least one selected from the group consisting of a hydroxyl radical (.OH) and a hydroperoxyl radical (OOH). The oxygen-containing intermediate radical may also control the degree of thinning of the ionomer binder through application of plasma and control of plasma retention time. However, the present disclosure is not limited thereto.

According to the present disclosure, the ionomer binder 131 coated on the surface of the metal catalyst 120 may be formed so as to be thinner than the ionomer binder 131 coated on the surface of the support 110 through the use of a solution including hydrogen peroxide ($H_2O_2$). That is, the ionomer binder 131 coated on the surface of the metal catalyst 120 may be formed so as to be thinner than the ionomer binder 131 coated on the surface of the support 110 through the use of an oxygen-containing intermediate radical formed from hydrogen peroxide ($H_2O_2$).

The metal catalyst 120 according to the present disclosure may include platinum (Pt). For example, the metal catalyst 120 and the support 110 may be a carbon-supported platinum catalyst (Pt/C). Since platinum (Pt) has high activity characteristics, the carbon-supported platinum catalyst may be implemented in order to increase the efficiency of the electrode for a fuel cell.

Alternatively, the metal catalyst 120 according to the present disclosure may include a platinum-transition metal alloy, or may include a platinum-rare earth metal alloy. It is possible to increase economic feasibility and save resources by reducing the use of expensive platinum (Pt) through implementation of an alloy catalyst mixed with other metals or a non-platinum group metal (Non-PGM) catalyst.

According to the present disclosure, the transition metal element may include at least one selected from the group consisting of scandium (Sc), titanium (Ti), vanadium (V), chromium (Cr), manganese (Mn), iron (Fe), cobalt (Co), nickel (Ni), copper (Cu), zirconium (Zr), yttrium (Y), niobium (Nb), molybdenum (Mo), ruthenium (Ru), rhodium (Rh), palladium (Pd), cadmium (Cd), iridium (Ir) and silver (Ag).

According to the present disclosure, the rare earth metal (lanthanide element) may include at least one selected from the group consisting of lanthanum (La), cerium (Ce), samarium (Sm), gadolinium (Gd), terbium (Tb), dysprosium (Dy) and thulium (Tm).

The ionomer binders 130 and 131 according to the present disclosure may include a perfluorosulfonic acid ionomer. The ionomer included in the ionomer binders 130 and 131 may be the same as the ionomer constituting the electrolyte membrane of a MEA.

Hereinafter, a method of manufacturing a catalyst composite for a fuel cell according to aspects of the present disclosure will be described with reference to FIGS. 3 to 6. For convenience of description, the following description will focus on differences from the description made above with reference to FIGS. 1 and 2.

Figure 3:
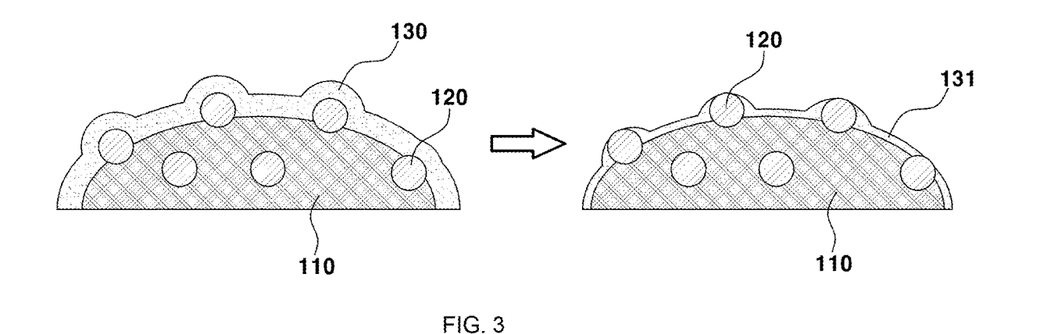
FIG. 3 is a conceptual view showing a method of manufacturing a catalyst composite for a fuel cell.
Figure 4:
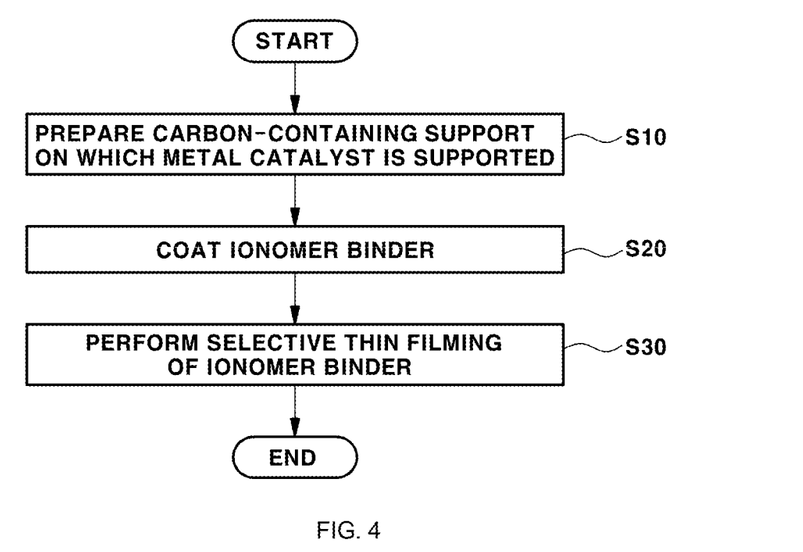
FIG. 4 is a flowchart schematically showing a method of manufacturing a catalyst composite for a fuel cell.

Referring to FIGS. 3 and 4, the method of manufacturing a catalyst composite for a fuel cell according to an aspect of the present disclosure may include the steps of preparing a carbon-containing support 110, on which a metal catalyst 120 is supported (S10), coating an ionomer binder 130 on the surfaces of the metal catalyst 120 and the support 110 (S20), and performing selective thin filming or preferential thinning of the ionomer binder 130 (S30). That is, the ionomer binder 131, which is coated on the surface of the metal catalyst 120 through the step (S30) of performing selective thin filming or preferential thinning, may be formed so as to be thinner than the ionomer binder 131 coated on the surface of the support 110.

In greater detail, according to the method of manufacturing a catalyst composite according to the present disclosure, selective thin filming or preferential thinning of the ionomer binder 130 (e.g. a perfluorosulfonic acid-containing ionomer binder) coated on the support 110 and the metal catalyst 120 in the electrode for a fuel cell may be performed such that the ionomer binder 131 coated on the surface of the metal catalyst 120 becomes thinner than the ionomer binder 131 coated on the surface of the support 110.

As described above, the ionomer binder 131 prepared in this manner may three-dimensionally interconnect the support 110 and the metal catalyst 120, thereby securing the proton conductivity of the ionomer binder 131 while maintaining the physical robustness of the catalyst composite and the electrode. That is, according to the method of manufacturing a catalyst composite according to the present disclosure, an ultra-thin ionomer binder 131 may be coated on the metal catalyst 120 and the electrode (e.g. the cathode 1). Therefore, as described above, the oxygen mass transport resistance of the ionomer binder 131 may be reduced, and the performance of the membrane-electrode assembly including the catalyst composite may be further improved.

Figure 5:
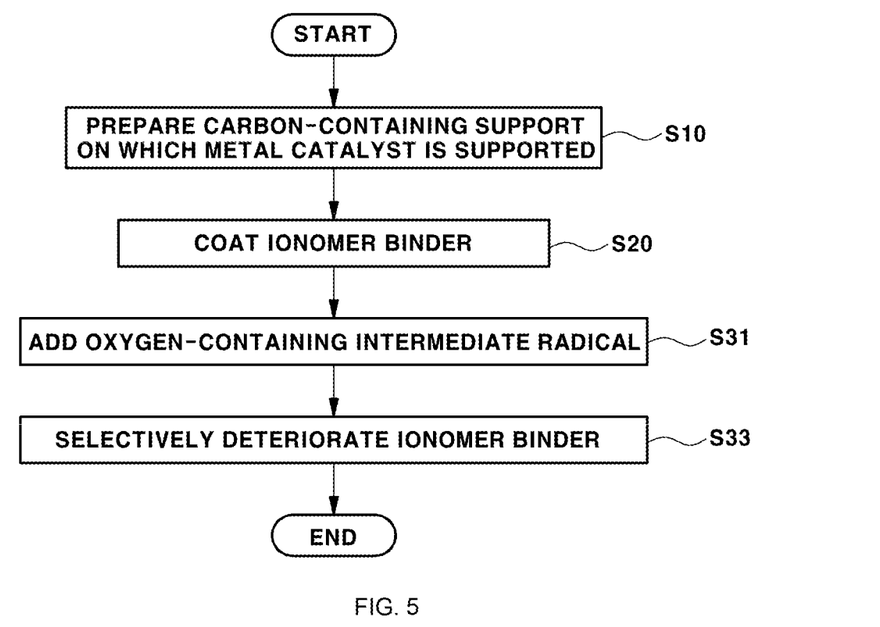
FIG. 5 is a flowchart schematically showing a method of manufacturing a catalyst composite for a fuel cell according to another aspect of the present disclosure.

Referring to FIG. 5, according to a method of manufacturing a catalyst composite according to another aspect of the present disclosure, the step of performing selective thin filming or preferential thinning of the ionomer binder may include the step of adding an oxygen-containing intermediate radical so as to bring an oxygen-containing intermediate radical into contact with the ionomer binder in order to deteriorate the ionomer binder (S31). That is, through the selective or preferential chemical degradation performed in the step (S31), the ionomer binder coated on the surface of the metal catalyst may be made thinner than the ionomer binder coated on the surface of the support.

The oxygen-containing intermediate radical may be derived from a solution containing hydrogen peroxide ($H_2O_2$). In one aspect, the solution including hydrogen peroxide ($H_2O_2$) may be Fenton's reagent.

Figure 6:
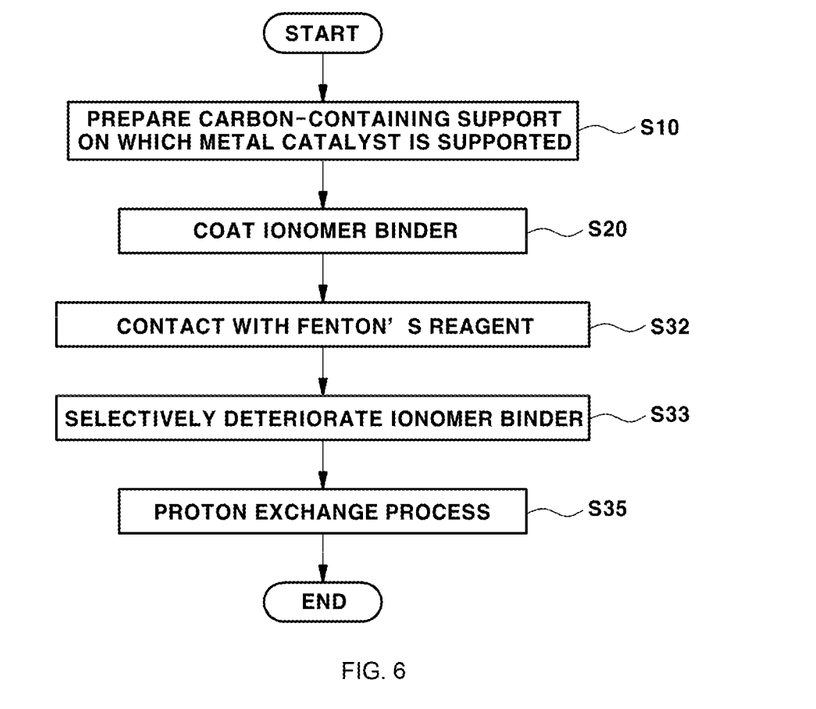
FIG. 6 is a flowchart schematically showing a method of manufacturing a catalyst composite for a fuel cell according to a further aspect of the present disclosure.

Referring to FIG. 6, according to a method of manufacturing a catalyst composite according to a further aspect of the present disclosure, the step of performing selective thin filming or preferential thinning of the ionomer binder may include the steps of contacting the ionomer binder with Fenton's reagent (S32) and of exchanging (protonating) ferrous cations ($Fe^{2+}$), derived from the Fenton's reagent, with protons ($H^+$) (S35). That is, through the contact of the ionomer binder with the Fenton's reagent (S32), the ionomer binder may be selectively deteriorated (S33), and subsequently the ferrous cations ($Fe^{2+}$) may be exchanged with protons (S35).

In greater detail, in the step of contacting the ionomer binder with Fenton's reagent (S32), hydrogen peroxide and water, which constitute the Fenton's reagent, may move in an inward direction from the surface of the electrode including the ionomer binder through hydrophilic proton-conducting channels, which serve as fluidic pathways in the ionomer binder (S32). At the same time, the ionomer binder may be chemically degraded by generating oxygen-containing intermediate radicals, such as hydroxyl radicals (.OH) and hydroperoxyl radicals (.OOH) (S33), with the result that the ionomer binder coated on the surface of the metal catalyst may be made thinner.

The step of contacting the ionomer binder with the Fenton's reagent (S32) may be performed in a manner of floating the electrode including the catalyst composite in which the ionomer binder is formed or the electrode bonded to the membrane in the Fenton's reagent. However, the present disclosure is not limited thereto. Alternatively, the step of contacting the ionomer binder with the Fenton's reagent (S32) may be performed in a manner of applying the Fenton's reagent to the catalyst composite including the ionomer binder or to the electrode including the catalyst composite.

In the step of contacting the ionomer binder with the Fenton's reagent (S32), the concentration of the Fenton's reagent, the ambient temperature and the contact time with the Fenton's reagent may be important factors for the thinning of the ionomer binder.

In the step of contacting the ionomer binder with the Fenton's reagent (S32) according to the present disclosure, the concentration of the hydrogen peroxide ($H_2O_2$) contained in the Fenton's reagent may be 5% by weight to 30% by weight, or 10% by weight to 20% by weight.

When the concentration of the hydrogen peroxide ($H_2O_2$) is less than 5% by weight, the amount of hydroxyl radical (.OH) generated from the Fenton's reagent is small, and thus the ionomer binder coated on the metal catalyst may not be chemically degraded within an appropriate time period. In addition, when Fenton's reagent in which the concentration of the hydrogen peroxide ($H_2O_2$) is less than 5% by weight is used, it may be desired that the contact time with the electrode including the catalyst composite be increased, and accordingly, the water contained in the Fenton's reagent may swell the ionomer binder, causing damage to the structure of the electrode.

On the other hand, when the concentration of the hydrogen peroxide ($H_2O_2$) exceeds 30% by weight, it is difficult to accomplish the chemical degradation of the ionomer binder as well as the selective thin filming or preferential thinning of the ionomer binder coated on the metal catalyst due to a violent chemical reaction between the metal catalyst (particularly, platinum (Pt)-containing catalyst) and hydrogen peroxide. In addition, this violent chemical reaction may cause damage to the chemical/physical structure of the electrode including the catalyst composite.

In the step of contacting the ionomer binder with the Fenton's reagent (S32) according to the present disclosure, the concentration of the ferrous cations ($Fe^{2+}$) contained in the Fenton's reagent may be 3 ppm to 50 ppm, or 5 ppm to 20 ppm. The concentration of the ferrous cations ($Fe^{2+}$) may be important for the selective thin filming or preferential thinning (or degradation) of the ionomer binder because the ferrous cations ($Fe^{2+}$) function as a catalyst to decompose the hydrogen peroxide ($H_2O_2$) into a hydroxyl radical (.OH) in the Fenton's reagent.

When the concentration of the ferrous cations ($Fe^{2+}$) is less than 3 ppm, the generation rate of the hydroxyl radical (.OH) is low, and thus it may be difficult to sufficiently chemically degrade the ionomer binder coated on the metal catalyst within an appropriate time period.

On the other hand, when the concentration of the ferrous cations ($Fe^{2+}$) exceeds 50 ppm, it is difficult to selectively degrade the ionomer binder because the generation rate of the hydroxyl radical (.OH) is too high. In addition, when a sulfonic acid (—$SO_3H$) group is contained in the ionomer binder, protons ($H^+$), which are counter ions of sulfonate (—$SO_3$—), which is a cation exchange functional group, are excessively substituted with ferrous cations ($Fe^{2+}$), which are external contaminants, and are contaminated. Thus, the performance of the electrode including the catalyst composite may be greatly lowered to an irreversible degree.

The step of contacting the ionomer binder with the Fenton's reagent (S32) according to the present disclosure may be performed at an ambient temperature of 10° C. to 95° C., or 20° C. to 80° C.

When the temperature of the Fenton's reagent is less than 10° C., the generation rate of the hydroxyl radical (OH) is low, and thus it may be difficult to sufficiently chemically degrade the ionomer binder coated on the metal catalyst within an appropriate time period.

On the other hand, when the temperature of the Fenton's reagent exceeds 95° C., the generation rate of the hydroxyl radical (.OH) is too high, and thus the speed at which the ionomer binder is chemically degraded is also too high, making it difficult to precisely control the selective thin filming or preferential thinning of the ionomer binder. In addition, swelling of the ionomer binder due to water may be accelerated by a high temperature.

The step of contacting the ionomer binder with the Fenton's reagent (S32) according to the present disclosure may be performed for a reaction time from 20 seconds to 600 seconds, or from 30 seconds to 150 seconds.

For example, when the electrode including the catalyst composite is reacted in contact with the Fenton's reagent, if the contact time is less than 20 seconds, this contact time between the surface of the electrode and the Fenton's reagent may be insufficient due to the surface characteristics of the electrode, which exhibits hydrophobicity at the initial stage in contact. That is, the time during which the surface of the Fenton's reagent is in contact with the surface of the ionomer binder is too short, and thus selective thin filming or preferential thinning of the ionomer binder may not occur.

On the other hand, when the contact time between the electrode including the ionomer binder containing sulfonic acid groups and the Fenton's reagent exceeds 600 seconds, the ionomer binder may become hydrophilic, resulting in excessive swelling. As a result, the physical structure of the electrode may be severely damaged.

Only a hydrogen peroxide aqueous solution, in which ferrous cations ($Fe^{2+}$) are removed from the Fenton's reagent, may be used, but ferrous cations ($Fe^{2+}$) may be included for effective selective or preferential degradation of the ionomer binder. The reaction occurring in the Fenton's reagent is shown, for example, in the following Reaction Formula 1 (M. Inaba et al., J. Power Sources, 51 (2006) 5746-5753).

[Reaction Formula 1]

At this time, for effective selective or preferential degradation of the ionomer binder, the Fenton's reagent may further include, in addition to ferrous cations ($Fe^{2+}$), at least one selected from the group consisting of magnesium ions ($Mg^{2+}$), calcium ions ($Ca^{2+}$), nickel ions ($Ni^{2+}$), copper ions ($Cu^{2+}$) and zinc ions ($Zn^{2+}$). However, the present disclosure is not limited thereto. That is, in addition to the above-described metal cations, one or more of various cations may be further included.

When the hydroxyl radical (.OH) derived from the Fenton's reagent completely deteriorates and removes the ionomer binder coated on the surface of the metal catalyst (e.g. a platinum (Pt)-containing catalyst) and then comes into direct contact with the surface of the metal catalyst, the hydroxyl radical (.OH) may be converted into water ($H_2O$) or into hydrogen ($H_2$) and oxygen ($O_2$) by the metal catalyst, and thus the metal catalyst may not be damaged.

On the other hand, when a sulfonic acid (—$SO_3H$) group is contained in the ionomer binder, protons ($H^+$) of the sulfonic acid (—$SO_3H$) group are substituted with the ferrous cations ($Fe^{2+}$) contained in the Fenton's reagent, resulting in contamination of the ionomer binder. Accordingly, the proton conductivity of the ionomer binder may be lowered, with the result that the performance of the fuel cell electrode and the cell may be lowered.

Therefore, for the reason described above, after the ionomer binder is selectively deteriorated (S33) through contact with the Fenton's reagent (S32), the step (S35) of exchanging the ferrous cations ($Fe^{2+}$), which have contaminated the ionomer binder, with protons may be performed in order to inhibit deterioration of the performance of the electrode.

Such a proton exchange step (S35) may include contacting a solution containing, for example, sulfuric acid ($H_2SO_4$) with the electrode. A method of bringing fumes containing sulfuric acid into contact with the electrode including the ionomer binder may be used, rather than the method of directly contacting a liquid sulfuric acid solution with the electrode including the ionomer binder.

Further, the proton exchange step (S35) may be performed under the condition in which the concentration of the sulfuric acid is 0.1 mol/L to 3 mol/L, or 0.4 mol/L to 1 mol/L.

When the concentration of the sulfuric acid is less than 0.1 mol/L, it may be difficult to sufficiently exchange the ferrous cations ($Fe^{2+}$) contained in the ionomer binder with protons within an appropriate time. In addition, when the proton exchange process is performed for a long time, the water constituting the sulfuric acid solution may swell the ionomer binder, thereby causing damage to the electrode structure.

On the other hand, when the electrode is exposed to a strong acidic condition in which the concentration of the sulfuric acid exceeds 3 mol/L, the metal catalyst (e.g. a platinum (Pt)-containing catalyst) included in the electrode may be dissolved. Therefore, in one aspect, the concentration of the sulfuric acid does not exceed 3 mol/L.

The step (S35) of exchanging the ferrous cations ($Fe^{2+}$), which have contaminated the ionomer binder, with protons in order to inhibit deterioration of the performance of the electrode may be performed through a process for activating the fuel cell.

In greater detail, after the step (S30 or S33) of selectively or preferentially thinning the ionomer binder, the step of preparing an electrode including a catalyst composite may be further included. Hydrogen or oxygen may be supplied to the electrode prepared in this manner so as to activate the electrode, by which the proton exchange step (S35) may be performed.

The proton exchange step (S35) may be performed when the step of activating the electrode by supplying hydrogen or oxygen to the same is performed at a temperature of 40° C. to 80° C.

Further, the electrode activation process may be more effective when hydrogen and oxygen are supplied at an excessive flow rate. For example, hydrogen and oxygen may be supplied under the condition in which the stoichiometric ratio of each of hydrogen and oxygen in the reaction of the fuel cell (water generation reaction) is 2.0 or higher.

In addition, the electrode activation process may be performed at a relative humidity (RH) of 10% to 100%. That is, the step (S35) of exchanging ferrous cations ($Fe^{2+}$) with protons may be performed by operating the fuel cell, in which the electrode is included, at a relative humidity (RH) of 10% to 100%. In one aspect, when the fuel cell, in which the electrode is included, is operated at a relative humidity (RH) of 50% to 100%, the activation process may be performed more effectively, and thus the ferrous cations ($Fe^{2+}$) of the ionomer binder may be exchanged with protons (H+) at high efficiency.

For example, in the electrode activation process, when the fuel cell is operated at a temperature of 40° C. to 80° C., a relative humidity of 50% to 100% and a predetermined current density for each section (low/medium/high current density: 0.1 to 0.4/0.4 to 0.8/0.8 to 1.5 A/cm²), the fuel cell and the electrode may be sufficiently activated, and thus protons generated through oxidation of hydrogen on the anode may actively move to the cathode 1. As a result, the ferrous cations ($Fe^{2+}$), which have contaminated the ionomer binder, may be exchanged with protons (S35), thereby inhibiting deterioration of the performance of the electrode.

Hereinafter, the present disclosure will be described in more detail by way of aspects and comparative examples through the following tests. However, the following aspects are only proposed for illustrative purposes, and the scope of the present disclosure is not limited to these aspects.

Test 1: Measurement of Fluoride Emission Rate of Ionomer Binder

Figure 7:
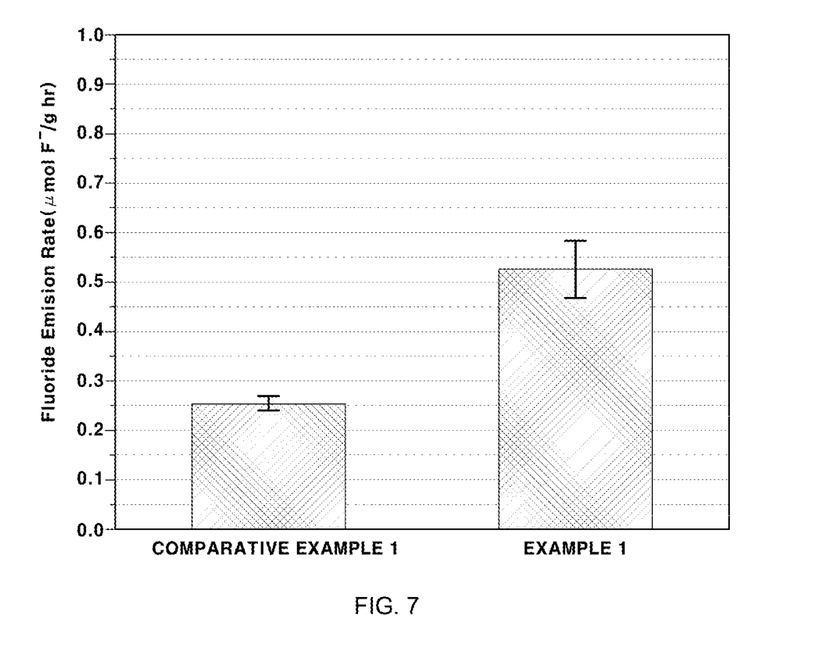
FIG. 7 is a graph showing the fluoride emission rates (FERs) measured in Example 1 of the present disclosure and in Comparative Example 1.

Example 1 and Comparative Example 1, manufactured under the following conditions, were respectively immersed in Fenton's reagent having the same composition and maintained at the same temperature for the same time period, and the fluoride emission rates (FERs) from the Fenton's reagents were measured and compared. FIG. 7 is a graph showing the fluoride emission rates (FERs) measured in Example 1 of the present disclosure and in Comparative Example 1.

Test Conditions

Coating Binder: Nafion® D2021 (Chemours Co., USA)

Simulated Sample for Binder Coating Platinum based Catalyst: 6 wt % of Pt/C Catalyst Specification of Pt/C Catalyst: Pt/C Containing 40 wt % of Platinum (Pt) (Tanaka Co., Japan)

Fenton Test Sample: 0.2±0.05 g of Specimen Having Thickness of 240±20 μm

Fenton Test Conditions: A test sample was immersed in 120 g of Fenton's Reagent, in which the concentration of hydrogen peroxide ($H_2O_2$) is 10 wt % and the concentration of $FeSO_4.7H_2O$ is 5 ppm, at room temperature (23° C.) for 65 hours.

Comparative Example 1 (Pristine Ionomer)

A sample (Pristine Ionomer) was prepared using a perfluorosulfonic acid ionomer dispersion (Nafion® D2021, Chemours Co., USA), which was not treated separately.

Example 1 (Composite Ionomer)

A sample (Composite Ionomer) was prepared by mixing a Pt/C catalyst with the same ionomer dispersion as in Comparative Example 1.

The fluoride emission rate measured in Example 1 was found to be about two times as high as that in Comparative Example 1, indicating that the ionomer binder coated on the Pt/C catalyst may be more easily chemically decomposed or degraded than the ionomer binder coated on the other regions. Therefore, it was confirmed that when the catalyst composite manufactured according to the present disclosure is applied to an electrode, it is possible to accomplish selective thin filming or preferential thinning of the ionomer binder coated on the metal catalyst.

Test 2: Measurement of Proton Conductivity of Ionomer Binder Before and after Proton Exchange Process A proton exchange process was carried out using a sulfuric acid aqueous solution.

Comparative Example 2

The Fenton test time for the sample (Composite Ionomer) of Example 1 was shortened to 5 minutes (under the same conditions of Fenton's reagent concentration and temperature as in Example 1) in order to induce degradation of the ionomer binder and contamination due to ferrous cations ($Fe^{2+}$). Thereafter, the proton conductivity in the in-plane direction of the ionomer binder specimen was measured at a temperature of 80° C. and a relative humidity of 10% to 90%.

Aspect 2

A proton exchange process was additionally applied to the sample of Comparative Example 2, which was a contaminated sample. The proton exchange process was performed in a manner such that the sample (Composite Ionomer) of Example 1 was immersed in a sulfuric acid aqueous solution having a concentration of 0.5 mol/L at room temperature (23° C.) for 5 minutes and such that the sample substituted with protons was taken out and rinsed using deionized water.

Thereafter, the proton conductivity in the in-plane direction of the ionomer binder specimen was respectively measured at a temperature of 80° C. and a relative humidity of 10% to 90%.

The proton conductivity values measured in Comparative Example 2 and Aspect 2 and the increase rate thereof are shown in Table 1 below.

TABLE 1

| Relative Humidity (%) | Proton Conductivity (mS/cm) | | Increase Rate (=(Conductivity of Aspect − Conductivity of Comparative Example) × 100/Conductivity of Comparative Example, %) |
|---|---|---|---|
| | Comparative Example 2 | Aspect 2 | |
| 10 | 1.27 ± 0.01 | 1.53 ± 0.01 | 20.4 |
| 20 | 4.19 ± 0.01 | 4.79 ± 0.01 | 14.4 |
| 30 | 8.67 ± 0.02 | 9.76 ± 0.03 | 12.3 |
| 40 | 14.80 ± 0.03 | 16.33 ± 0.01 | 10.4 |
| 50 | 22.44 ± 0.06 | 24.31 ± 0.08 | 8.4 |
| 60 | 31.53 ± 0.05 | 33.80 ± 0.09 | 7.2 |
| 70 | 42.94 ± 0.24 | 46.25 ± 0.11 | 7.7 |
| 80 | 58.00 ± 0.31 | 62.24 ± 0.34 | 7.3 |
| 90 | 81.92 ± 0.51 | 90.39 ± 0.63 | 10.3 |

Referring to Table 1, it can be confirmed that the proton conductivity in Aspect 2, to which the proton exchange process according to the present disclosure was applied, greatly increased compared to that in Comparative Example 2. From this, it can be confirmed that the proton conductivity of the ionomer binder increased after the proton exchange step (S35) over the whole range of relative humidity, which ranged from 10% to 90%. In particular, the difference in the proton conductivity between Comparative Example 2 and Aspect 2 was more clearly observed at a relative humidity of 10% to 50%. This means that the increase rate of the proton conductivity is more clearly confirmed at a relative humidity of 10% to 50%.

In conclusion, it can be known from the result of Test 2 that it is possible to inhibit, reduce, or minimize deterioration in proton conductivity that may occur during the selective thin filming or preferential thinning step (S30) through the step (S35) of substituting the ferrous cations ($Fe^{2+}$), which have contaminated a portion of the ionomer binder for selective thin filming or preferential thinning of the ionomer binder, with protons.

As is apparent from the above description, according to a catalyst composite for a fuel cell and a method of manufacturing the same according to aspects of the present disclosure, an ionomer binder coated on the surface of a metal catalyst, which is supported on a carbon-containing support, is selectively thinned, to thereby reduce oxygen mass transport resistance and improve the proton conductivity of a catalyst and an electrode including the same.

In addition, as the proton conductivity of the ionomer binder included in the catalyst composite for a fuel cell of the present disclosure is improved, the utilization rate of the catalyst may be increased, and the performance and durability of the electrode may be maintained at an equivalent or higher level while reducing the use of catalyst.

In addition, the physical robustness of the catalyst composite, in which the ionomer binder is included, and the electrode may be maintained through selective thin filming or preferential thinning of the ionomer binder.

In addition, it is possible to increase economic feasibility and save resources by reducing the use of the platinum catalyst due to the catalyst composite for a fuel cell of the present disclosure.

It will be appreciated by those skilled in the art that the effects achievable through the disclosure are not limited to those that have been particularly described hereinabove, and other effects of the disclosure will be more clearly understood from the above detailed description.

The disclosure has been described in detail with reference to aspects thereof. However, it will be appreciated by those skilled in the art that changes may be made in these aspects without departing from the principles and spirit of the disclosure, the scope of which is defined in the appended claims and their equivalents.

What is claimed is:

1. A catalyst composite for a fuel cell comprising:
    a support comprising carbon (C);
    a metal catalyst supported on the support; and
    an ionomer binder comprising only a perfluorosulfonic acid ionomer, the ionic binder directly coated on a surface of the support and on a surface of the metal catalyst in one layer,
    wherein the ionomer binder coated on the surface of the metal catalyst is thinner than the ionomer binder coated on the surface of the support.

2. The catalyst composite of claim 1, wherein the ionomer binder coated on the surface of the metal catalyst is thinner than the ionomer binder coated on the surface of the support through use of an oxygen-containing intermediate radical.

3. The catalyst composite of claim 1, wherein the ionomer binder coated on the surface of the metal catalyst is thinner than the ionomer binder coated on the surface of the support through use of a solution comprising hydrogen peroxide ($H_2O_2$).

4. The catalyst composite of claim 1, wherein the metal catalyst comprises platinum (Pt).

5. The catalyst composite of claim 1, wherein the metal catalyst comprises a platinum-transition metal alloy, and
    wherein the transition metal comprises at least one selected from the group consisting of scandium (Sc), titanium (Ti), vanadium (V), chromium (Cr), manganese (Mn), iron (Fe), cobalt (Co), nickel (Ni), copper (Cu), zirconium (Zr), yttrium (Y), niobium (Nb), molybdenum (Mo), ruthenium (Ru), rhodium (Rh), palladium (Pd), cadmium (Cd), iridium (Ir), and silver (Ag).

6. The catalyst composite of claim 1, wherein the metal catalyst comprises a platinum-rare earth metal alloy, and
    wherein the rare earth metal comprises at least one selected from the group consisting of lanthanum (La), cerium (Ce), samarium (Sm), gadolinium (Gd), terbium (Tb), dysprosium (Dy), and thulium (Tm).

* * * * *